May 14, 1957     W. A. ECKLEY     2,791,910

TAKE-UP DEVICE FOR V-BELT DRIVES

Filed Feb. 16, 1955     2 Sheets-Sheet 1

INVENTOR.
William A. Eckley
BY
Murray G. Gleeson
ATTORNEY

May 14, 1957 W. A. ECKLEY 2,791,910
TAKE-UP DEVICE FOR V-BELT DRIVES
Filed Feb. 16, 1955 2 Sheets-Sheet 2

INVENTOR.
William A. Eckley
BY
Murray A. Gleeson
ATTORNEY

2,791,910

TAKE-UP DEVICE FOR V-BELT DRIVES

William A. Eckley, Palos Heights, Ill., assignor to Goodman Manufacturing Company, Chicago, Ill., a corporation of Illinois Application February 16, 1955, Serial No. 488,644

1 Claim. (Cl. 74—242.1)

This invention relates to the V-belt drives and more particularly to an improved device therefor whereby the belt can be driven under higher tension.

The take-up device according to the present invention is useful primarily in installations where the belt loading is as much as 40% higher than the loading for the usual low tension belts. Both kinds of belts will stretch in service about the same amount, but in the case of the lightly loaded belt the stretch will be uniform throughout the life thereof. If, however, the belt is highly loaded at the outset a large percentage of the total stretch will take place during the early part of the total belt life, the additional stretch occurring as a small percentage for the balance of the belt life. In either case the total life is substantially the same.

The amount of power which can be transmitted by a belt is, of course, a function of the belt tension, and by maintaining the tension at a high value throughout the life of the belt, considerable economy can be achieved since a smaller belt can be employed for an equal amount of power.

It is an object of the invention, therefore, to provide an improved belt take-up device which will enable the belt to be maintained at a high loading throughout its entire life.

Other objects and important features of the invention will be apparent from a study of the specification following taken with the drawings, which together show a preferred embodiment of the invention and what is now considered to be the best mode of practicing the principles thereof. Other embodiments may be suggested to those having the benefit of the teachings herein, and it is therefore intended that the scope of the invention not be limited by the precise embodiment herein shown, such other embodiments being intended to be reserved especially as they fall within the scope and purview of the subjoined claims.

Figure 2:
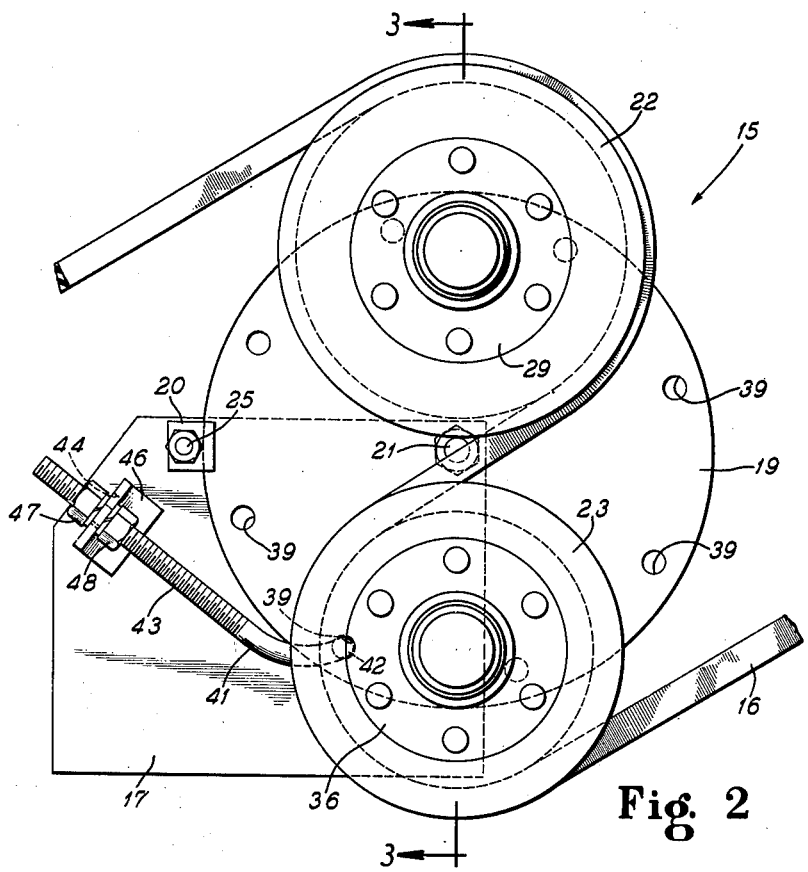
Fig. 2 is an enlarged front elevation view of the improved V-belt take-up device according to the present invention.
Figure 3:
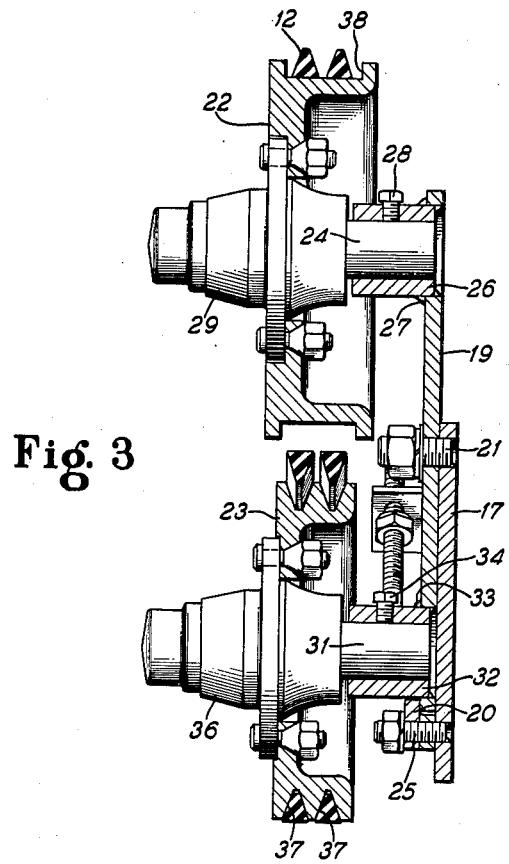
Figure 4:
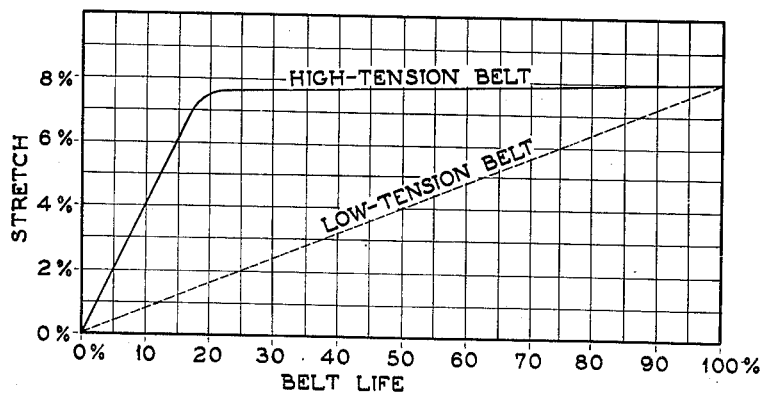

Fig. 3 is a vertical sectional view taken along the line 3—3 of Fig. 2, looking in the direction of the arrows, certain parts being shown in side elevation; and Fig. 4 is a graph showing how a uniformly high tension may be maintained on a V-belt employed with a belt take-up device according to the present invention, such uniformly high tension being maintained thereon for the majority of the total life thereof.

Figure 1:
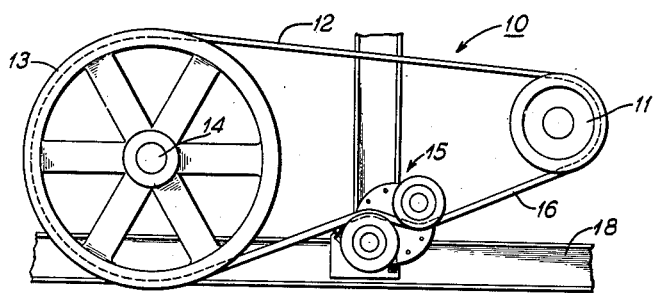
Fig. 1 is a schematic showing of a V-belt drive having the improved take-up device according to the present invention embodied therein, whereby the V-belt can be driven at a uniformly high tension throughout its belt life.

Referring now particularly to Fig. 1 of the drawings, there is shown a V-belt drive system indicated generally by the reference numeral 10, and including a driving pulley 11 having one or more V-belts 12 trained therearound which drives a driven pulley 13 mounted upon a shaft 14 connected to any driven mechanism, not shown.

The V-belt 12 has a return reach 16 which has the slack side thereof adjusted by a belt take-up device according to the present invention and indicated generally by the reference numeral 15. In the position shown in Fig. 1, the belt 12 may be considered to have been just installed; accordingly, the belt take-up device 15 is in a position corresponding to a condition of substantially no stretch.

Referring now to Fig. 2 of the drawings, the belt take-up device 15 is shown in a position where the belt has stretched approximately 8%, as shown in Fig. 4 of the drawings, such stretch having taken place during the first 15 to 20% of the total belt life.

The belt take-up device 15 is mounted upon a bracket 17 which is welded to a channel shaped member 18 shown in Fig. 1. A support 19 is mounted on the bracket 17 and is held in position upon a stud 21, as seen in Fig. 3. Support 19 is held against the bracket 17 by lugs 20 held to the bracket 17 by threaded studs 25. The support 19 is in the form of a circular plate and supports a pair of idler sheaves 22 and 23, around which the return reach 16 of the belt 12 is trained. As seen the sheaves 22 and 23 are disposed substantially diametrically on the support 19. As seen in Fig. 3 idler sheave 22 is arranged to be supported on a stub shaft 24 held in a sleeve 26 welded at 27 to the circular support 19. As seen in Fig. 3 the stub shaft 24 is held in position by means of a set screw 28 and the sheave 22 is arranged to turn with a hub 29 enclosing a bearing, not shown, supported upon the stub shaft 24.

The sheave 23 is likewise supported upon a stub shaft 31 which is held in a sleeve 32 welded to the circular support 19 at welds 33. As seen in Fig. 3 the stub shaft 31 is held in position by a set screw 34. The sheave 23 has a hub 36, enclosing a bearing, not shown, supported upon the stub shaft 31.

Idler sheave 23 is provided with V-grooves 37, while sheave 22 has a single groove of rectangular cross section 38, in which the belt is reversed so that instead of riding at the smaller edge thereof, it rides on larger edge in the manner shown.

Means are provided for rotating the support 19 together with the sheaves 22 and 23 in a direction so as to maintain the proper degree of tension upon the return reach 16 of the V-belts.

To this end the circular support 19 is provided near the periphery with a number of evenly spaced openings 39 which are engaged by a take-up arm 41 bent at its end 42 in a direction normal to the plane of the support 19 to define a hook for the engagement with the openings 39. The take-up arm 41 is threaded as at 43 for a portion of its length, and the threaded portion 43 passes through an opening 44 in a lug or bracket 46 extending from and welded to the bracket 17. The take-up arm 41 is maintained in proper position by means of adjusting nuts 47 and 48 which bear against the bracket 46.

It is believed evident that the operation of the take-up device according to the present invention may be readily understood. The take-up arm 41 may be loosened by means of the adjusting nuts 47 and threaded to a position whereby the hook portion 42 thereof can engage the next opening 39 on the circular support 19. When so engaged the take-up may be made manually, and the final adjustment made by the take-up nut 47, the entire assembly being locked in place by the other take-up nut 48.

According to the present invention, and as seen more clearly in Fig. 4, it is possible to maintain the tension in the belt at a high value at all times, and the take-up device is operable for all values of belt stretch, although the belt may be stretched as much as 8% as seen in Fig. 4.

In the usual operation of the device most of the take-up is required only during the first 15 to 20% of the belt life, when it is necessary to rotate the support 19 to a succeeding position of engagement by the take-up arm 41. Minor adjustments of the support 19 can thereafter be effected by use of the adjusting nuts 47 and 48, and such adjustment can be made for the remaining 85 to 80% of the belt life.

While the invention has been described in terms of a preferred embodiment thereof, its scope is intended to be limited only by the claim here appended.

I claim as my invention:

A V-belt take-up device comprising a fixed support, a rotatable supoprt of circular configuration, a pair of idler members mounted on said rotatable support substantially diametrically thereof and arranged to have a reach of a belt trained therearound, a plurality of spaced circular openings in said rotatable support susbtantially at the periphery thereof, a take-up arm for maintaining said rotatable support in a position for properly tensioning said belt including a hook at one end of said arm selectively engageable with one of said spaced circular openings, and means for anchoring said takeup arm at its other end comprising a bracket disposed on said fixed support, said bracket having an aperture therein through which said takeup arm extends, and means threadably engaged with said takeup arm and bearing against said bracket for adjusting the position of said takeup arm and said rotatable support.

References Cited in the file of this patent

UNITED STATES PATENTS

| | | |
|---|---|---|
| 882,635 | Hodgkinson | Mar. 24, 1908 |
| 959,667 | White | May 31, 1910 |
| 1,505,940 | Berryman | Aug. 26, 1924 |
| 1,690,145 | Vivarttas | Nov. 6, 1928 |
| 2,719,435 | Rinta | Oct. 4, 1955 |